(12) United States Patent
Lin

(10) Patent No.: US 8,020,479 B2
(45) Date of Patent: Sep. 20, 2011

(54) TRIMMING APPARATUS

(75) Inventor: Tsung-Yu Lin, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 410 days.

(21) Appl. No.: 12/330,576

(22) Filed: Dec. 9, 2008

(65) Prior Publication Data

US 2009/0320665 A1    Dec. 31, 2009

(30) Foreign Application Priority Data

Jun. 30, 2008 (CN) .......................... 2008 1 0302461

(51) Int. Cl.
   *B26D 1/08* (2006.01)
   *B26D 7/01* (2006.01)
(52) U.S. Cl. .......................... 83/694; 83/914
(58) Field of Classification Search ........... 83/694, 83/693, 915.5, 707, 437.1, 914
   See application file for complete search history.

(56) References Cited

U.S. PATENT DOCUMENTS

| | | | | |
|---|---|---|---|---|
| 1,681,739 A | * | 8/1928 | McLaughlin | 83/468.2 |
| 2,087,728 A | * | 7/1937 | Boriski | 83/629 |
| 3,245,296 A | * | 4/1966 | Valente | 83/162 |
| 5,092,208 A | * | 3/1992 | Rosa-Miranda | 83/171 |
| 5,159,865 A | * | 11/1992 | Hinckley | 83/16 |
| 5,934,166 A | * | 8/1999 | Herlihy | 83/605 |
| 7,000,521 B1 | * | 2/2006 | Cheng et al. | 83/631 |
| 7,536,941 B2 | * | 5/2009 | Chou et al. | 83/563 |
| 2005/0204881 A1 | * | 9/2005 | Chen | 83/13 |
| 2009/0096128 A1 | * | 4/2009 | Huang | 264/161 |
| 2009/0123239 A1 | * | 5/2009 | Huang | 407/33 |
| 2009/0255392 A1 | * | 10/2009 | Lee | 83/651.1 |

FOREIGN PATENT DOCUMENTS

| | | | |
|---|---|---|---|
| CN | 1970250 A | * | 5/2007 |
| TW | 200615091 A | | 5/2006 |

* cited by examiner

*Primary Examiner* — Stephen Choi

(74) *Attorney, Agent, or Firm* — Altis Law Group, Inc.

(57) ABSTRACT

A trimming apparatus includes a base, a ridge portion protruding from the base, a sliding block mounted on the base, a fixing member, and a trimming tool. The base defines a sliding groove. The sliding block is slidably engaged in the sliding groove and defines a holding groove receiving a workpiece to be trimmed. The fixing member is fixes the sliding block in the sliding groove. The trimming tool is arranged over the base. The trimming tool has a main body and a blade facing and aligned with the ridge portion, and moves toward the ridge portion to trim the workpiece.

20 Claims, 4 Drawing Sheets

TRIMMING APPARATUS

BACKGROUND

1. Technical Field

The present disclosure relates to trimming apparatuses, and particularly, to an apparatus for trimming injection molded lenses.

2. Description of Related Art

Camera modules are currently included as a feature in various portable electrical devices such as mobile phones, personal digital assistants (PDAs), and laptop computers to increase functionality. A lens module is a key component of the camera module. Plastic optical lenses are widely used in many lens modules as they can be easily manufactured using injection molding. Plastic optical lenses play a key role in reducing volume of lens modules and decreasing the number of optical lenses used.

During manufacture of plastic optical lenses, a number of lenses are formed by injection molding. The process requires a multi-branch passage supplying molten plastic to the mold cavities. After molding, the plastic in the multi-branch passage solidifies to form a branch and sprue connected to the lens, thereby forming a lens preform. Typically, each lens is manually trimmed from the branch at a sprue position using tools such as trimming pliers and scissors, providing a number of finished plastic optical lenses.

However, during trimming, fissures and burrs can be generated due to inaccuracy of process. Furthermore, cutouts may occur in the lenses due to mispositioned trimming. As sizes of the plastic optical lenses are reduced, such errors increasingly affect the quality of the plastic optical lens products, and, in turn, the final optical product.

What is needed, therefore, is a trimming apparatus addressing the described limitations.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION OF THE EMBODIMENTS

The disclosure is now described in detail with reference to the drawings.

Figure 1:
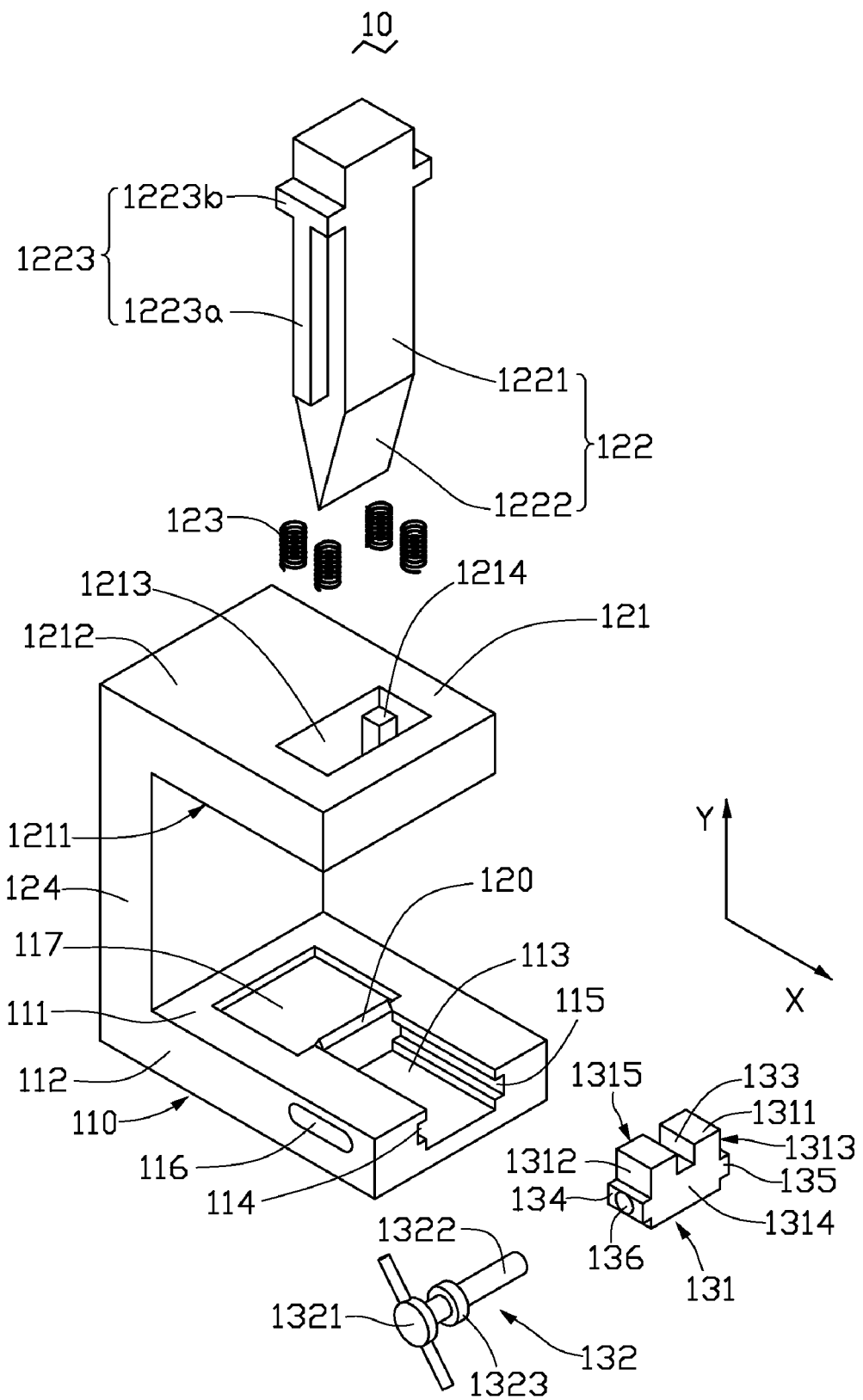
FIG. 1 is a schematic, exploded view of a trimming apparatus, according to an exemplary embodiment.
Figure 2:
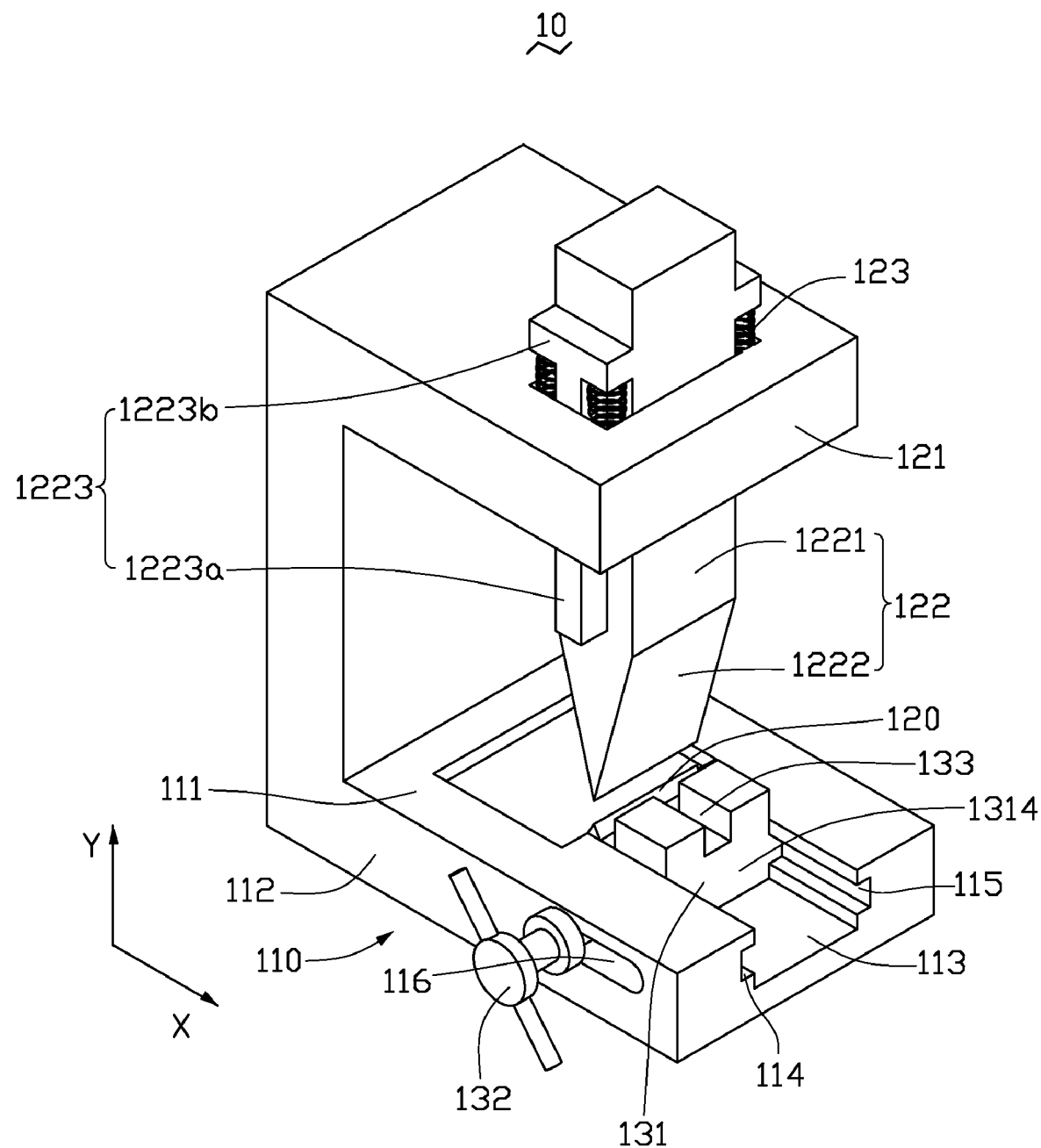
FIG. 2 is a schematic, assembled view of a trimming apparatus according to an exemplary embodiment.
Figure 3:
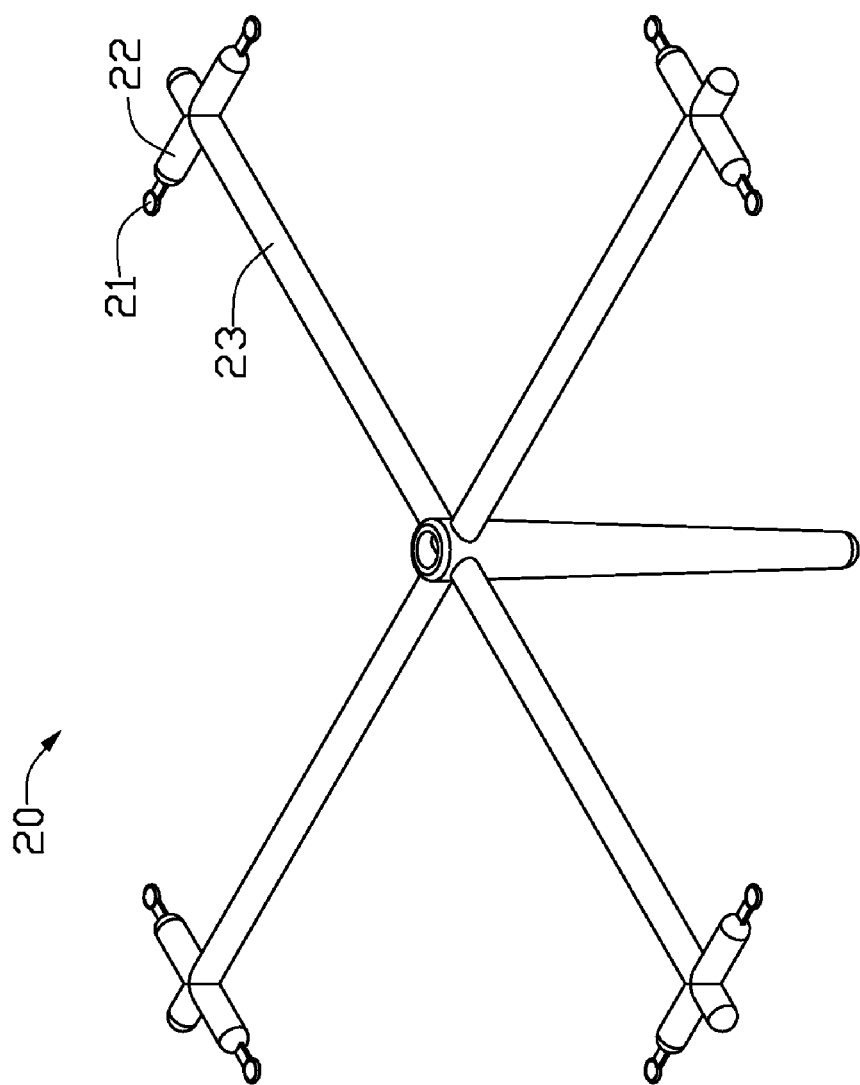
FIG. 3 is a schematic, isometric view of a lens preform.
Figure 4:
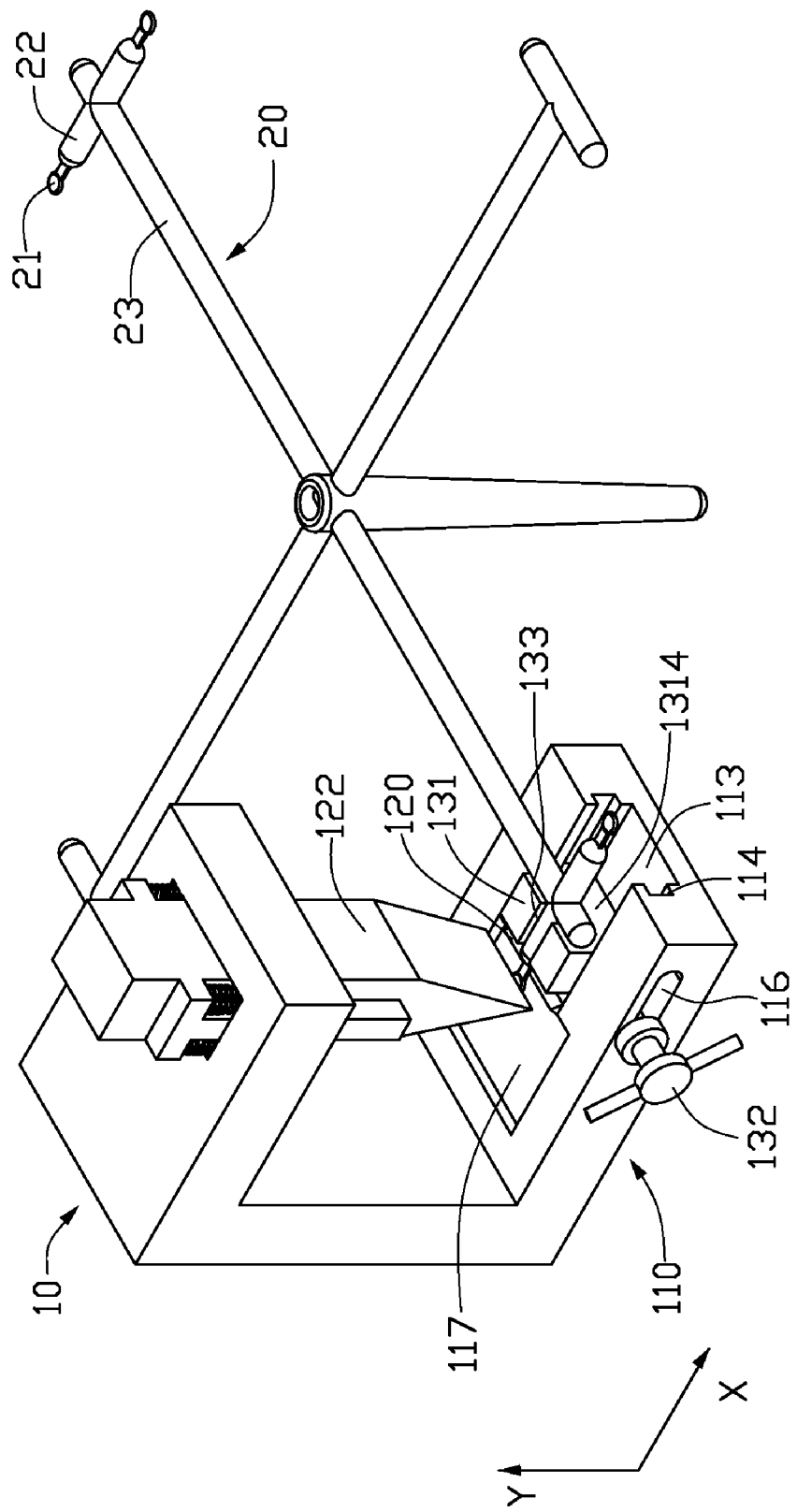
FIG. 4 is a schematic view of a lens preform shown in FIG. 3 mounted on the trimming apparatus shown in FIG. 2.

Referring to FIG. 1 and FIG. 2, a trimming apparatus 10, according to an exemplary embodiment, includes a base 110, a ridge portion 120 mounted on the base 110, a trimming tool 122, a sliding block 131 and a fixing member 132. The trimming tool 122 is arranged over the base 110 and faces the ridge portion 120.

The base 110 includes an operating surface 111 and a lateral surface 112 adjacent thereto. The operating surface 111 defines a sliding groove 113, receiving the sliding block 131 therein.

As shown, the base 110 further defines a first latching groove 114 and a second latching groove 115, on opposite inner side surfaces of the sliding groove 113. The first and second latching grooves 114 and 115, extend perpendicular to a moving direction (Y axis in FIG. 1) of the trimming tool 122. The shape and size of the sliding groove 113 vary with practical requirements.

Additionally, the base 110 also defines a positioning groove 116 and a receiving container 117. The positioning groove 116 is defined in the lateral surface 112 and communicates with the sliding groove 113. Here, the positioning groove 116 is defined near to and intercommunicates with the first latching groove 114. The receiving container 117 is adjacent to the sliding groove 113 for receiving the lens trimmed from the lens preform 20.

The ridge portion 120 protrudes from the base 110 and is located at an end of the sliding groove 113 adjacent to the receiving container 117. Here, the ridge portion 120 includes a blade (not labeled) such as an electrothermal trimming blade, facing and aligned with the blade of the trimming tool 122, for being utilized by the trimming tool 122.

The trimming apparatus 10 further employs a supporting plate 121 oppositely connected to the base 110 by a supporting body 124 on which the trimming tool 122 is mounted. The supporting plate 121 includes a first surface 1211 facing the operating surface 111 and a second surface 1212 opposite the first surface 1211. The supporting plate 121 defines a through hole 1213 through the first and second surfaces 1211, 1212, and includes at least two resisting members, here, four resisting members 1214 in the through hole 1213. The through hole 1213 allows the trimming tool 122 to move towards the base 110 therethrough. Each of the four resisting members 1214 is located at a corner of the through hole 1213. The supporting plate 121 may be mounted on other supporting bodies unconnected to the base 110 to conduct trimming.

The trimming tool 122 includes a main body 1221 and a blade 1222 adjoining the main body 1221. The blade 1222 faces and is aligned with the ridge portion 120. A perpendicular projection of an edge of the blade 1222 on the base 110 coincides with that of the ridge portion 120 thereon, and is perpendicular to both the X and Y axis directions. As shown, the blade 1222 is an electrothermal trimming blade engaging the ridge portion 122.

The trimming tool 122 passes through the through hole 1213 and is elastically installed on the supporting plate 121. The trimming tool 122 moves towards the ridge portion 120. In detail, the main body 1221 includes two "T" shaped lateral protrusions 1223 at opposite sides thereof. Each of the lateral protrusions 1223 includes a guiding portion 1223a and a resisting portion 1223b perpendicularly adjoining the guiding portion 1223a. The main body 1221 passes through the through hole 1213, and the blade 1222 is opposite to the ridge portion 120. The guiding portion 1223a is positioned between two adjacent resisting members 1214. One end of the resisting portion 1223b is connected to a corresponding resisting member 1214 including a resilient element 123 (such as a spring) received in the through hole 1213. The guiding portion 1223a (Y axis in FIG. 1) extends perpendicular to the operating surface 111, and resisting portion 1223b (X axis in FIG. 1) is parallel to the operating surface 111.

When the main body 1221 is pressed downward, the blade 1222 of the trimming tool 122 moves towards the base 110 to engage the ridge portion 122 to complete trimming. When the main body 1221 is released, rebound force from the compressed spring 123 moves the blade 1222 away from the ridge portion 122, completing trimming. The main body 1221 can guide the trimming tool 122 to operate perpendicular to the operating surface 111 without incline. As a result, trimming positions remain aligned.

The sliding block 131 slides on the base 110 along the X axis shown in FIG. 2, perpendicular to a longitudinal orientation of the edge of the ridge portion 120 and the moving direction of the trimming tool 122. As shown, the sliding block 131 is slidably received in the sliding groove 113.

In detail, the sliding block 131 has a top surface 1311, a first side surface 1312, a second side surface 1313 opposite to the first side surface 1312, a third side surface 1314, and a fourth side surface 1315 opposite to the third side surface 1314. The sliding block 131 inwardly defines a holding groove 133 in the top surface 1311. The holding groove 133 is exposed at the third side surface 1314 and the fourth side surface 1315. A longitudinal orientation of the holding groove 133 is parallel to the sliding direction of the sliding block 131, that is, perpendicular to the longitudinal orientation of the edge of the ridge portion 120 and the moving direction of the trimming tool 122.

The sliding block 131 further includes a first latching protrusion 134 corresponding to the first latching groove 114, a second latching protrusion 135 corresponding to the second latching groove 115, and a screw hole 136. The first latching protrusion 134 extends outwardly from the first side surface 1312, and the second latching protrusion 135 extends outwardly from the second side surface 1313. The first latching protrusion 134 is slidably received in the first latching groove 114, and the second latching protrusion 135 is slidably received in the second latching groove 115, thereby slidably mounting the sliding block 131 on the base 110. As a result, the sliding block 131 is slidable along the length of the latching grooves 114 and 115. It is noted that mounting between the sliding block 131 and the base 110 is not, however, limited thereto, and can alternatively include the sliding block 131 sliding on the operating surface 111 of the base 110 along the sliding direction, obviating the need for latching grooves 114, 115. The screw hole 136 is defined in the first latching protrusion 134 and extends inwardly from an outer side surface thereof opposite to the first side surface 1312. The screw hole 136 can optionally communicate the first latching protrusion 134 with the second latching protrusion 135.

The fixing member 132 fixes the sliding block 131 in a predetermined position on the base 110. For example, the fixing member 132 may be movable along an X axis within the positioning groove 116. The fixing member 132 includes a first end 1321, a second end 1322, and a limiting element 1323 therebetween. The first end 1321 provides a process portion allowing holding and rotation, thereby rotating the second end 1322. The opposite end 1322 includes a screw thread on an outer surface thereof, engaging screw hole 136 to fix the sliding block 131 in a desired position. The limiting element 1323 is a board. A diameter of the limiting element 1323 exceeds a width (along Y axis in FIG. 2) of the positioning groove 116. Thus, when the second end 1322 engages screw hole 136, a portion of the limiting element 1323 tightly contacts the lateral surface 112, to prevent the fixing member 132 from relative movement to the base 110.

While certain embodiments have been described and exemplified above, various other embodiments from the foregoing disclosure will be apparent to those skilled in the art. The present disclosure is not limited to the particular embodiments described and exemplified but is capable of considerable variation and modification without departure from the scope of the appended claims.

What is claimed is:

1. A trimming apparatus, comprising:
   a base defining a sliding groove and two latching grooves communicating with the sliding groove;
   a ridge portion protruding from the base;
   a sliding block mounted on the base, the sliding block slidably engaged in the sliding groove and defining a holding groove configured for receiving a workpiece, the sliding block comprising two latching protrusions on opposite sides thereof, the two latching protrusions being slidably engaged in the two latching grooves respectively;
   a fixing member configured for fixing the sliding block in the sliding groove; and
   a trimming tool over the base, the trimming tool comprising a main body and a blade facing and aligned with the ridge portion, capable of moving towards the ridge portion.

2. The trimming apparatus as claimed in claim 1, wherein one of the two latching protrusions defines a screw hole in which one end of the fixing member is received.

3. The trimming apparatus as claimed in claim 1, wherein the base defines a positioning groove on a lateral surface thereof, the positioning groove communicates with the sliding groove, and the fixing member passes through the positioning groove and engages the sliding block, thereby fixing the sliding block in the sliding groove in a predetermined position.

4. The trimming apparatus as claimed in claim 3, wherein the positioning groove extends parallel to the moving direction of the sliding block.

5. The trimming apparatus as claimed in claim 1, wherein the ridge portion includes a blade facing and aligned with the blade of the trimming tool.

6. The trimming apparatus as claimed in claim 1, further comprising a supporting plate defining a through hole through which the trimming tool passes, the trimming tool being elastically supported on the supporting plate.

7. The trimming apparatus as claimed in claim 6, further comprising at least two resilient members, at least two resisting members disposed in the through hole, and two resisting portions on opposite sides of the main body, each of the resilient members being disposed between a corresponding resisting portion and a corresponding resisting member.

8. The trimming apparatus as claimed in claim 1, wherein the base defines a receiving container adjacent to the ridge portion for receiving a trimmed workpiece.

9. The trimming apparatus as claimed in claim 1, wherein the sliding block is slidable in a direction perpendicular to the longitudinal orientation of the ridge portion and the moving direction of the trimming tool.

10. The trimming apparatus as claimed in claim 1, wherein the trimming tool comprises an electrothermal trimming blade.

11. The trimming apparatus as claimed in claim 1, wherein the ridge portion comprises an electrothermal trimming blade.

12. A trimming apparatus, comprising:
    a base defining a sliding groove and a positioning groove on a lateral surface thereof, the positioning groove communicating with the sliding groove;
    a ridge portion protruding from the base;
    a sliding block mounted on the base, the sliding block slidably engaged in the sliding groove and defining a holding groove configured for receiving a workpiece;

a fixing member passing through the positioning groove and engaging the sliding block, thereby fixing the sliding block in the sliding groove in a predetermined position; and a trimming tool over the base, the trimming tool comprising a main body and a blade facing and aligned with the ridge portion, capable of moving towards the ridge portion.

13. The trimming apparatus as claimed in claim 12, wherein the ridge portion includes a blade facing and aligned with the blade of the trimming tool.

14. The trimming apparatus as claimed in claim 12, wherein the base defines a receiving container adjacent to the ridge portion for receiving a trimmed workpiece.

15. The trimming apparatus as claimed in claim 12, wherein the sliding block is slidable in a direction perpendicular to the longitudinal orientation of the ridge portion and the moving direction of the trimming tool.

16. The trimming apparatus as claimed in claim 12, further comprising a supporting plate defining a through hole through which the trimming tool passes, the trimming tool being elastically supported on the supporting plate.

17. A trimming apparatus, comprising:
a base defining a sliding groove;
a ridge portion protruding from the base;
a sliding block mounted on the base, the sliding block slidably engaged in the sliding groove and defining a holding groove configured for receiving a workpiece;
a fixing member configured for fixing the sliding block in the sliding groove;
a trimming tool over the base, the trimming tool comprising a main body and a blade facing and aligned with the ridge portion, and being capable of moving towards the ridge portion;
a supporting plate defining a through hole through which the trimming tool passes;
at least two resilient members;
at least two resisting members disposed in the through hole; and
two resisting portions on opposite sides of the main body, each of the two resilient members being disposed between a corresponding resisting portion and a corresponding resisting member.

18. The trimming apparatus as claimed in claim 17, wherein the ridge portion includes a blade facing and aligned with the blade of the trimming tool.

19. The trimming apparatus as claimed in claim 17, wherein the base defines a receiving container adjacent to the ridge portion for receiving a trimmed workpiece.

20. The trimming apparatus as claimed in claim 17, wherein the sliding block is slidable in a direction perpendicular to the longitudinal orientation of the ridge portion and the moving direction of the trimming tool.

* * * * *